(12) United States Patent
Wei et al.

(10) Patent No.: US 8,248,691 B2
(45) Date of Patent: Aug. 21, 2012

(54) INFRARED LIGHT TRANSMISSION FILM

(75) Inventors: Guang-Xue Wei, Buffalo Grove, IL (US); Feng Wu, Lake Zurich, IL (US)

(73) Assignee: Avery Dennison Corporation, Pasadena, CA (US)

( * ) Notice: Subject to any disclaimer, the term of this patent is extended or adjusted under 35 U.S.C. 154(b) by 491 days.

(21) Appl. No.: 12/473,508

(22) Filed: May 28, 2009

(65) Prior Publication Data

US 2009/0296202 A1    Dec. 3, 2009

Related U.S. Application Data

(60) Provisional application No. 61/057,365, filed on May 30, 2008.

(51) Int. Cl.
*G06K 7/10*  (2006.01)

(52) U.S. Cl. ........................................................ 359/350

(58) Field of Classification Search .................. 359/359, 359/530

See application file for complete search history.

(56) References Cited

U.S. PATENT DOCUMENTS

| | | | |
|---|---|---|---|
| 2,407,680 A | 9/1946 | Palmquist et al. | |
| 3,563,771 A | 2/1971 | Tung | |
| 3,758,193 A * | 9/1973 | Tung | 359/359 |
| 3,810,804 A | 5/1974 | Rowland | |
| 3,830,682 A | 8/1974 | Rowland | |
| 4,243,618 A | 1/1981 | Van Arnam | |
| 4,486,363 A | 12/1984 | Pricone et al. | |
| 4,507,557 A | 3/1985 | Tsikos | |
| 4,601,861 A | 7/1986 | Pricone et al. | |
| 5,200,851 A | 4/1993 | Coderre et al. | |
| 5,712,024 A | 1/1998 | Okuzaki et al. | |
| 5,936,770 A | 8/1999 | Nestegard et al. | |
| 6,015,214 A | 1/2000 | Heenan et al. | |
| 6,406,758 B1 | 6/2002 | Bottari et al. | |
| 6,537,673 B2 | 3/2003 | Sada et al. | |
| 6,767,102 B1 | 7/2004 | Heenan et al. | |
| 2001/0048169 A1 | 12/2001 | Nilsen et al. | |
| 2002/0163505 A1 | 11/2002 | Takekawa | |
| 2005/0178953 A1 | 8/2005 | Worthington et al. | |
| 2005/0190162 A1 | 9/2005 | Newton | |
| 2008/0103267 A1 | 5/2008 | Hurst et al. | |
| 2009/0135162 A1 * | 5/2009 | Van De Wijdeven et al. | 345/175 |

FOREIGN PATENT DOCUMENTS

WO    99/36805    7/1999

OTHER PUBLICATIONS

Invitation to Pay Additional Fees and Partial Search Report issued in corresponding IA No. PCT/US2009/030694 dated May 4, 2009.
International Search Report and Written Opinion issued in corresponding International Application No. PCT/US2009/030694 dated Aug. 5, 2009.

* cited by examiner

*Primary Examiner* — Derek S Chapel

(74) *Attorney, Agent, or Firm* — Avery Dennison Corporation

(57) ABSTRACT

An infrared light transmission film includes a polymer matrix and at least one red colorant, blue colorant, and yellow colorant that are uniformly dispersed in the polymer matrix at amounts effective to allow transmission through the film of at least about 85% of light with wavelengths over about 800 nm while blocking transmission of at least about 90% of light with wavelengths less than about 750 nm.

29 Claims, 3 Drawing Sheets

INFRARED LIGHT TRANSMISSION FILM

CROSS-REFERENCE TO RELATED APPLICATION

This application claims the benefit of U.S. Provisional Patent Application No. 61/057,365 filed May 30, 2008, which is incorporated herein by reference in its entirety.

FIELD OF THE INVENTION

The present invention relates to an infrared light transmission film and to retroreflective articles that include an infrared light transmission film.

BACKGROUND OF THE INVENTION

Infrared light transmission film can be used to form infrared retroreflective sheeting that retroreflects infrared light while retroreflecting substantially no visible light. Such infrared retroreflective sheeting can be used, for example, in signs or markings detectable only by infrared viewing devices or in touch screens of position detection devices where it is desirable to reflect infrared radiation received from an originating source back to the originating source.

U.S. Pat. No. 5,200,861 discloses an infrared retroreflective cube-cornered sheeting that includes cube-corner elements that are infrared (IR) selective. The IR selective cube corner elements are formed from a polymeric matrix that is transmissive to at least some wavelengths of infrared light but is substantially absorptive to visible light. The polymer matrix includes a polymer, which is typically transmissive to both visible light and infrared light, and a combination of red, yellow, green, and violet colorants sufficient to absorb substantially all of the visible light and permit transmission of infrared light having a wavelength of about 750 nm to about 1100 nm.

SUMMARY OF THE INVENTION

One aspect of the invention relates to an infrared light transmission film. The infrared light transmission film includes a polymer matrix and at least one red colorant, blue colorant, and yellow colorant that are uniformly dispersed in the polymer matrix at amounts effective to allow transmission through the film of at least about 85% of light with wavelengths over about 800 nm while blocking transmission of at least about 90% of light with wavelengths less than about 750 nm.

The colorants can be incorporated in the film at an amount of about 0.05% to about 5%, by weight of the film. In one example, the red colorant can be incorporated in the film at an amount of about 0.3% to about 4%, by weight of the film, the blue colorant being provided in the film at an amount of about 0.1% to about 0.4%, by weight of the film, and the yellow colorant being provided in the film at an amount of about 0.1% to about 0.6%, by weight of the film.

The polymer matrix can include at least one of a polycarbonate, acrylic resin, polyester, polyvinyl chloride, polyurethane, polyolefin, polystyrene, styrene-acrylonitriles copolymer, polyarylate, copolymers thereof, or combinations thereof. In one example the polymer matrix can include a polymethyl methacrylate.

In another aspect of the invention, the polymer matrix can include a combination of red colorants, a combination of blue colorants, and a combination of yellow colorants. The yellow colorant can include Color Index (C.I.) Solvent Yellow 163, C.I. Solvent Yellow 114, and C.I. Solvent Yellow 109, the blue colorant can include C.I. Solvent Blue 35 and C.I. Solvent Blue 36, and the red colorant can include C.I. Solvent 227, C.I. Solvent Red 23, and C.I. Solvent Red 24.

Another aspect of the invention relates to an infrared retroreflective article. The infrared retroreflective article includes an infrared light transmission film and a plurality of retroreflective elements. The infrared light transmission film includes a polymer matrix and at least one red colorant, blue colorant, and yellow colorant uniformly dispersed in the polymer matrix at amounts effective to allow transmission through the film of at least about 85% of light with wavelengths over about 800 nm while blocking transmission of at least about 90% of light with wavelengths less than about 750 nm.

The colorants can be incorporated in the film at an amount of about 0.05% to about 5%, by weight of the film. In one example, the red colorant can be incorporated in the film at an amount of about 0.3% to about 4%, by weight of the film, the blue colorant being provided in the film at an amount of about 0.1% to about 0.4%, by weight of the film, and the yellow colorant being provided in the film at an amount of about 0.1% to about 0.6%, by weight of the film.

The polymer matrix can include a combination of red colorants, a combination of blue colorants, and a combination of yellow colorants. The yellow colorant can include C.I. Solvent Yellow 163, C.I. Solvent Yellow 114, and C.I. Solvent Yellow 109, the blue colorant can include C.I. Solvent Blue 35 and C.I. Solvent Blue 36, and the red colorant can include C.I. Solvent 227, C.I. Solvent Red 23, and C.I. Solvent Red 24.

In an aspect of the invention the retroreflective elements can include an array of cube corner elements and be defined a surface of the infrared light transmission film.

In another aspect, the retroreflective article can include a retroreflective substrate, which includes the retroreflective elements. The retroreflective substrate can be formed of a substantially transparent polymer matrix. The infrared light transmission film can be disposed on a first surface of the retroreflective substrate. A second surface of the retroreflective substrate can define the retroreflective elements. In a further aspect, a metallized layer can be disposed on the retroreflective elements.

A further aspect of the invention relates to an infrared retroreflective sheeting. The infrared retroreflective sheeting includes a retroreflective layer and an infrared light transmission layer disposed on a first surface of the retroreflective layer. The infrared light transmission layer includes a polymer matrix and at least one red colorant, blue colorant, and yellow colorant uniformly dispersed in the polymer matrix at amounts effective to allow transmission through the infrared light transmission layer of at least about 85% of light with wavelengths over about 800 nm while blocking transmission of at least about 90% of light with wavelengths less than about 750 nm. The retroreflective layer can be substantially transparent and include a second surface opposite the first surface. The second surface can define an array of cube corner elements.

A still further aspect of the invention relates to a touch screen system. The touch screen system includes an infrared light emitting source for emitting infrared light in at least a portion of a viewing area, an infrared retroreflective sheeting disposed along at least a portion of the viewing area for reflecting emitted infrared light, and an infrared light detector for detecting infrared light reflected by the infrared retroreflective sheeting. The infrared retroreflective sheeting can include a plurality of retroreflective elements and an infrared light transmission film. The film can include a polymer matrix and at least one red colorant, blue colorant, and yellow colorant uniformly dispersed in the polymer matrix at amounts effective to allow transmission through the film of at least about 85% of light with wavelengths over about 800 nm while blocking transmission of at least about 90% of light with wavelengths less than about 750 nm.

BRIEF DESCRIPTION OF THE DRAWINGS

The foregoing and other embodiments will become apparent to those skilled in the art upon reading the following description with reference to the accompanying drawings.

DETAILED DESCRIPTION

Figure 1:
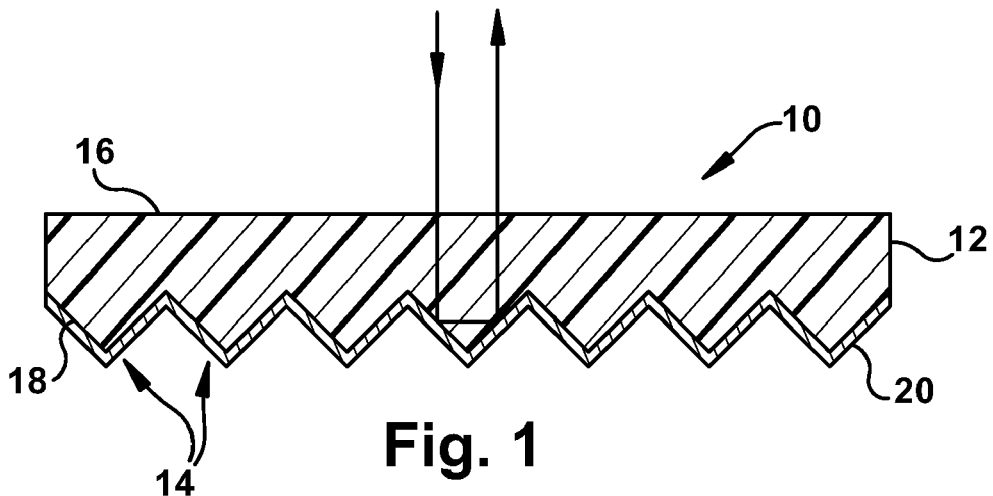
FIG. 1 illustrates a cross-sectional view of an infrared retroreflective sheeting in accordance with an aspect of the invention.

The present invention relates to an infrared light transmission film (or sheeting) that can be used to form an infrared light retroreflective article. Various embodiments of the invention are illustrated in the drawings. In each instance, the infrared light transmission film includes a polymer matrix and at least one red colorant, blue colorant, and yellow colorant that are uniformly dispersed in the polymer matrix. The red colorant, the blue colorant, and the yellow colorant are provided in the polymer matrix at amounts or a ratio effective to provide an optically (or visually) black film that allows transmission of at least about 85% of light at wavelengths over about 800 nm while blocking transmission of at least about 90% of light at wavelengths less than about 750 nm.

If retroreflective properties are desired, retroreflective elements commonly used in the retroreflective sheeting industry, such as microprismatic cube corner elements or glass microspheres, can be designed into the article. When an infrared light transmission retroreflective article is fabricated into, for example, a touch screen display, infrared light from an infrared light emitting source enters the infrared light transmission retroreflective article, through a front face thereof, the infrared transmission film, to the retroreflective elements, and is retroreflected back to an infrared light detector. The visible light entering the front face of the infrared light transmission retroreflective article is substantially blocked or absorbed by the infrared light transmission film so that there is substantially no visible light transmitted through or reflected from the infrared light transmission retroreflective article.

FIG. 1 illustrates an infrared light transmission (IR) retroreflective sheeting 10 in accordance with an aspect of the invention. The IR retroreflective sheeting 10 can be used in applications, such as touch screen displays where high infrared light transmission and low visible light transmission is desired. The IR retroreflective sheeting 10 includes an infrared light transmission (IR) film (or layer) 12 and a plurality of retroreflective elements 14. The IR film 12 includes a first surface 16 and a second opposite surface 18 displaced from the first surface 16. The first surface 16 defines a front surface of the IR retroreflective sheeting 10 and is generally flat or smooth.

The IR film 12 includes a polymer matrix and at least one red colorant (e.g., pigment and/or dye), blue colorant, and yellow colorant that are incorporated (e.g., dispersed or dissolved) in the polymer matrix. The red colorant, the blue colorant, and the yellow colorant can include red, blue, and yellow dyes and pigments that may be dissolved or dispersed, respectively, in the polymer matrix. Individually, the red colorant, the blue colorant, and yellow can absorb (or block) at least some portion of visible light while permitting transmission of infrared light through the IR film 12. When combined and dispersed or dissolved in the polymer matrix at an effective amount or ratio, the polymer matrix and IR film 12 with the combined red, blue, and yellow colorants allows transmission of at least about 85% of light with wavelengths over about 800 nm while blocking transmission of at least about 90% of light with wavelengths less than about 750 nm.

The red colorant, blue colorant, and yellow colorant should be compatible with the polymer used to form the polymer matrix and tend not to bloom or migrate when dispersed or dissolved in the polymer matrix. In one aspect of the invention, the red colorant, blue colorant, and yellow colorant can include dyes that are soluble in the polymer matrix. Examples of dyes that can be used includes the following dyes, identified by the Colour Index, (C.I.) Generic name assigned by the Society of Dyers and Colourists and the American Association of Textile Chemists and Colorists: C.I. Solvent Red 227, C.I. Solvent Red 23, C.I. Solvent Red 24, C.I. Solvent Blue 35, C.I. Solvent Blue 36, C.I. Solvent Yellow 163, C.I. Solvent Yellow 114, and C.I. Solvent Yellow 109. These dyes are commercially available from one or more known dye manufacturing companies including, for example, BASF, Bayer AG, and Mitsubishi Chemical Industries. Other red, blue, and yellow C.I. dyes can also be used as long as such dyes when combined in the polymer matrix allow transmission of at least about 85% of light with wavelengths over about 800 nm while blocking transmission of at least about 90% of light with wavelengths less than about 750 nm.

Each red colorant, blue colorant, or yellow colorant (e.g., red, blue or yellow C.I. dye) can be used alone or in combination with other red colorants, blue colorants, or yellow colorants as long as at least one red colorant, blue colorant, and yellow colorant is incorporated in the polymer matrix. Other colorants can that are not red, blue, or yellow can also be combined with the red, blue, and yellow colorants so long as the other colorants do not impair the light transmission at wavelengths above about 800 nm and/or inhibit formulation or compounding of the IR film 12. For example, green colorant when combined with the red colorant, the blue colorant, and yellow colorant in a polymer matrix can potentially reduce or inhibit transmission of infrared light below 85% at wavelengths over about 800 nm. Orange colorant and violet colorant when combined with the red colorant, blue colorant, and yellow colorant can add unnecessary complexity and compounding to forming the IR film 12 due to the specific chemistry of these colorants. In an aspect of the invention, the IR film can be free of other colorants besides red colorants, blue colorants, and yellow colorants so that the colorants incorporated in the polymer matrix consist of red colorants, blue colorants, and yellow colorants.

Any combination of red colorants, blue colorants, and yellow colorants can be used or incorporated in the polymer matrix as long as the combination of red colorants, blue colorants, and yellow colorant allows transmission of at least about 85% of light with wavelengths over about 800 nm while blocking transmission of at least about 90% of light with wavelengths less than about 750 nm. Such blend of red colorants, blue colorants, and yellow colorants can provide the IR film 12 with a substantially visually black color. In one example, the polymer matrix includes a combination of red colorants, blue colorants, and yellow colorants. In a more specific example, the red colorant is a combination of C.I. Solvent Red 227, C.I. Solvent Red 23, and C.I. Solvent Red 24, the blue colorant is a combination of C.I. Solvent Blue 35 and C.I. Solvent Blue 36, and the yellow is colorant is a combination of C.I. Solvent Yellow 163, C.I. Solvent Yellow 114, and C.I. Solvent Yellow 109.

A blend of the red colorant, the blue colorant, and the yellow colorant can be incorporated in the polymer matrix at amount of about 0.05% to about 5%, by weight of the IR film 12. The proportion or ratio of colorants included in the polymeric matrix depends on the specific colorant employed as well as the thickness of the IR film 12 and the intended use of the IR film 12. By way example, the amount of red colorant incorporated in the polymer matrix is about 0.3% to about 4.0%, by weight of the IR film, the amount of blue colorant incorporated in the polymer matrix is about 0.1% to about 0.4%, by weight of the IR film, and the amount of the yellow colorant incorporated in the polymer matrix is about 0.1% to about 0.6%, by weight of the IR film.

The polymer matrix can be formed from at least one polymer in which the red colorant, blue colorant, and yellow colorant can be readily incorporated (e.g., dispersed and/or dissolved) and which is compatible with the chemistries of the colorants such that the polymer is not undesirably degraded by the colorant. In one example, the polymer can have a high modulus of elasticity and be readily melt mixed and extruded into a film, which can be used to form at least a portion of a retroreflective sheeting. The polymer with the incorporated colorants or other additives can also be transparent or clear and allow transmission of visible and infrared light. Examples of polymers that can be used to form the polymer matrix include polycarbonates, acrylic resins, such as polymethyl methacrylate (PMMA) resins, polyesters, polyvinyl chlorides, polyurethanes, polyolefins, polystyrenes, styrene-acrylonitriles copolymers, polyarylates, and copolymers and combinations thereof. In another example, the polymer used to form the polymer matrix is an extrudable acrylic resin, such as polymethyl methacrylate.

Optionally, other generally known film components can be included in the IR film 12. These other components can include, for example, Ultraviolet (UV) absorbers and hindered amine light stabilizers (HALS). It may desirable to include UV absorbers and/or HALS compounds in the IR film when the IR retroreflective sheeting 10 is used in outdoor applications, such as in signage, and/or when the IR film 12 include polymers that can degrade upon prolonged exposure to UV light. One or more of either or both can be included in the polymer matrix. The inclusion of the UV absorbers and HALs in the polymer matrix can potentially retard degradation of the polymer and fading of the colorants if the selected polymer or UV colorant is adversely affected by exposure to UV light.

Examples of UV absorber that can be incorporated in the polymer matrix are benzotriazole UV absorbers, such as 2-(2H-benzotriazol-2-yl)-4,6-bis-(1-methyl-1-phenylethyl) phenol, sold under the trade name "Tinuvin 234" by Ciba-Geigy, and 2-(4,6-diphenyl-1,3,5-triazine-2-yl)-5(hexyl)oxyphenol, sold commercially by Ciba-Geigy as "Tinuvin 1577", and benzophenone UV light absorbers, such as 2-hydroxy-4-n-octoxybenzophenone commercially available from Great Lakes Chemical Corporation under the trade name "Lowilite 22", 2,2-dihydroxy-4,4-dimethoxybenzophenone available under the trade name "Uvinul 3049" from BASF, and 2,2',2,4'-tetrahydroxybenzophenone available under the trade name "Uvinul 3050" from BASF. It has been found that these benzophenone types of UV absorbers are particularly useful in a colored acrylic matrix. Those skilled in the art will appreciate that other UV absorbers exist and can also be used in the IR film 12 of the present invention Examples of HALS compounds are oligomeric hindered amine compounds from Great Lakes Chemical under the trade name "Lowilite 62", which is commercially available from Ciba-Geigy. Other examples of HALS compounds are: dimethyl succinate polymer with 4-hydroxy-2,2,6,6-tetramethyl-1-piperidineethanol, commercially available from Ciba Specialty Additives as "Tinuvin 622"; poly[[6-[(1,1,3,3,-tetramethylbutyl)amino]-s-triazine-2,4-diyl][[(2,2,6,6,-tetramethyl-4-piperidyl-)imino]hexamethylene[(2,2,6,6-tetramethyl-4-piperidyl)imino]], which is commercially available from Ciba Specialty Additives under the trade name Chimassorb 944; "Tinuvin 791" which is commercially available from Ciba Specialty Additives and is a blend of poly[[6-1,1,3,3,-tetramethylbutyl)amino]-s-triazine-2,4-diyl][[(2,2,6,6,-tetramethyl-4-piperidyl)imino]hexamethylene[(2,2,6,6-tetramethyl-4-piperidyl)]imino]] and bis(2,2,6,6-tetramethyl-4-piperidynyl)sebacate; and "Hostavin N30" available from Clariant. Those skilled in the art will recognize that many other hindered amine light stabilizers exist and can also be used in the IR film 12 of the present invention.

The polymer matrix makes up a substantial percent by weight of the IR film 12. In one example, the polymer matrix can comprise about 90% to about 99% by weight of the IR film 12. In a more specific example, the polymer matrix can comprise about 95% to about 99% by weight of the IR film 12. When present, a UV absorber can be provided at levels of about 0.1% to about 5%, by weight of the IR film 12, for example, about 0.3% to about 3%, by weight of the IR film 12. When a HALS component is present, it can be provided at about 0.1% to about 2% by weight of the IR film 12, for example, about 0.3% to about 1.5% weight percent, based upon the total weight of the IR film 12.

The retroreflective elements 14 can be incorporated into the second surface 18 of the IR film 12 that is opposite to and laterally displaced from the first surface 16. The retroreflective feature provided by the retroreflective elements 14 is illustrated by the arrowed light pattern shown in FIG. 1. For simplicity of illustration, only two dimensions of this three-dimensional reflection are illustrated. This simplified light pattern shows an incident IR beam reflected twice by the IR retroreflective sheeting 10 to provide a parallel reflected IR beam.

In an aspect of the invention, the retroreflective elements 14 can include a plurality of microprismatic cube corner elements. The cube corner elements are arranged as an array in the second surface 18 of the IR film 12. The size and canting of the cube corner elements can be selected to provide a desired reflectivity and uniformity of the IR retroreflective sheeting 10.

In one example, the retroreflective elements 14 can include triangular cube corner prisms that are directly machined in the IR film 12 using ruling or diamond turning techniques and defined by grooves in the second surface 18. The triangular cube corners can be in the form of isosceles triangular cube corners with equal cube depths and cants. It will be appreciated that other types of triangular cubes corners are possible including, for example, scalene triangles and bi-level or tri-level cutting of the groove sets.

The cube corner prismatic constructions can be manufactured in accordance with prismatic construction procedures disclosed in, for example, U.S. Pat. No. 3,810,804, U.S. Pat. No. 4,486,363, U.S. Pat. No. 4,601,861, U.S. Pat. No. 6,015,214, and U.S. Pat. No. 6,767,102, the disclosures of which are herein incorporated by reference in their entirety. It will be appreciated, any process and equipment can be used to incorporate the microprismatic cube corner elements in or otherwise provide them on or in the IR film 12. Additionally, it will be appreciated that while cube corner elements are shown as being an integral part of the IR film the cube corner elements can also be formed separately (e.g., by casting or molding) from a substrate and bonded to the IR film 12.

The plurality of retroreflective elements 14 can be metallized 20 with a metal, such as aluminum, silver, nickel, and gold, to modify the retroreflective performance of the IR retroreflective sheeting 10. Metallization of the retroreflective elements 14 also allows the IR retroreflective sheeting 10 to be sealed so that the sheeting can be cleaned and is otherwise not susceptible to contaminants and/or moisture that may have deleterious effects on the retroreflectivity of IR retroreflective sheeting 10. Metallization of the retroreflective elements 14 can be performed by depositing (e.g., sputtering or vacuum depositing) a metal film over the second surface 18 of the IR film or outer surface of the retroreflective elements 14.

The thickness of the IR film 12 and the thickness of the IR retroreflective sheeting 10 can vary somewhat depending upon the particular article being prepared. Typically, the IR film 12 can have a substantially uniform thickness of between about 2 mils and about 20 mils (0.05 mm to 0.5 mm), more typically between about 3 mils and about 10 mils (0.075 mm to 0.25 mm).

Figure 2:
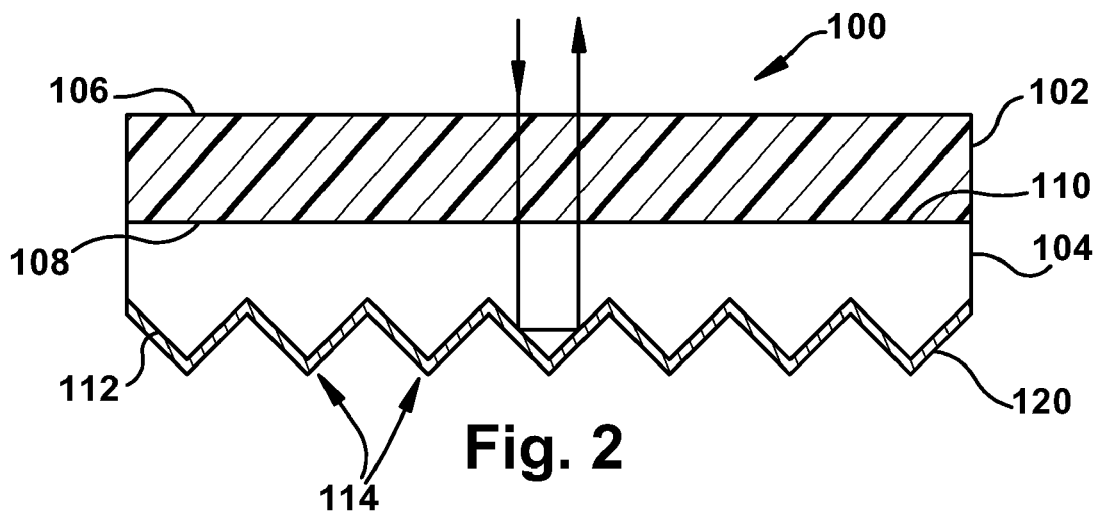
FIG. 2 illustrates a cross-sectional view of an infrared retroreflective sheeting in accordance with another aspect of the invention.

FIG. 2 illustrates an IR retroreflective sheeting 100 in accordance with another aspect of the invention. The IR retroreflective sheeting 100 in accordance with this aspect includes an IR transmission film 102 that is disposed and secured to a retroreflective layer 104. The IR film 102 includes a first surface 106 and an opposite second surface 108 displaced from the first surface 106. The first surface defines a front surface of the IR retroreflective sheeting 100 and is generally flat or smooth. The second surface 108 is disposed on the retroreflective layer 104 so that IR light incident the IR retroreflective sheeting 100 passes through the IR film 102 before passing through the retroreflective layer 104. The IR film 102 can have a similar color and composition as the color and composition described above with respect to IR film 12 of FIG. 1.

The retroreflective layer 104 on which the IR film 102 is disposed includes a first surface 110 and an opposite second surface 112 that is laterally displaced from the first surface 110. The first surface 110 is substantially flat or smooth and secured to the second surface 108 of IR film 102. The second surface 112 defines a plurality of retroreflective elements 114.

The retroreflective layer 104 can be made of a clear or substantially transparent polymer that allows high transmission of IR light and potentially visible light. The polymer can have a high modulus of elasticity and be extruded to allow for melt processing as well as embossing or forming retroreflective elements 114, such as microprismatic corner cubes, in the retroreflective layer 104. Examples of polymers that can be used to form the retroreflective substrate include polycarbonates, acrylic resins, such as polymethyl methacrylate (PMMA) resins, polyesters, polyvinyl chlorides, polyurethanes, polyolefins, polystyrenes, styrene-acrylonitriles copolymers, polyarylates, and copolymers and combinations thereof. By way of example, the polymer can include an acrylic, such as an acrylic material with an index of refraction of about 1.49. It will be appreciated that acrylics as well as polymers having a higher or lower index of refraction can also be used.

The retroreflective elements 114 defined by the second surface 112 of the retroreflective layer 104 can include a plurality of microprismatic cube corner elements. The cube corner elements can be arranged as an array in the second surface 112 of the retroreflective layer 104. The refractive index of the retroreflective layer as well as the size and canting of the cube corner elements can be selected to provide a desired reflectivity and uniformity of the IR retroreflective sheeting 100.

The plurality of retroreflective elements 114 can be metallized 120 with a metal, such as aluminum, silver, nickel, and gold, to modify the retroreflective performance of the IR retroreflective sheeting 100. Metallization of the cube corner elements also allows the IR retroreflective sheeting 100 to be sealed so that the sheeting 100 can be cleaned and is otherwise not susceptible to contaminants and/or moisture that may have deleterious effects on the retroreflectivity of IR retroreflective sheeting. Metallization of the cube corner elements can be performed by depositing (e.g., sputtering or vacuum depositing) a metal film 120 over the second surface 112 of the retroreflective layer 104 or the outer surface of the retroreflective elements 114.

The retroreflective feature provided by the retroreflective elements 114 is illustrated by the arrowed light pattern shown. For simplicity of illustration, only two dimensions of this three-dimensional reflection are illustrated. This simplified light pattern show an incident IR beam reflected twice by the IR retroreflective sheeting 100 to provide the parallel reflected IR beam.

The thickness of the IR film 102 and the thickness of the retroreflective layer 104 can vary somewhat depending upon the particular article being prepared. Typically, the IR film 102 can have a substantially uniform thickness of between about 2 mils and about 20 mils (0.05 mm to 0.5 mm), more typically between about 3 mils and about 10 mils (0.075 mm to 0.25 mm). A typical retroreflective layer 104 can have a substantially uniform thickness of between about 2 mils and about 20 mils (0.05 mm to 0.5 mm), more typically between about 3 mils and about 10 mils (0.075 mm to 0.25 mm). The retroreflective elements can have a height of, for example, about 4 mils.

The IR retroreflective sheeting 100 in accordance with the invention can be formed by laminating the IR film 102 and retroreflective layer 104, such as by heat and/or pressure application using conventional equipment. Depending upon the particular use of the IR retroreflective sheeting 100 according to the invention, optional tie layers can be provided between the IR film 102 and the retroreflective layer 104. A laminating adhesive can also be included to the extent deemed necessary for a particular construction or end use needs. Any such tie layer or adhesive layers so included can be selected so as to not significantly detract from the properties to which the IR retroreflective sheeting 100 according to the invention.

An IR retroreflective sheeting 100 formed from an IR film disposed on a clear cube corner retroreflective layer is more effective at reflecting large entrance angle IR light than IR reflective sheeting in which the IR film (having the same color and IR transmission as the IR film disposed on the clear retroreflective layer) forms the retroreflective layer, as shown in FIG. 1. For example, in accordance with Dennis's Model, the IR signal loss (i.e., IR light loss) from an IR reflective sheeting in which the IR film forms the cube corner retroreflective layer at 60 degrees for 4 mil cubes is about 40%; whereas, the IR signal loss from an IR retroreflective sheeting formed from and IR film disposed on a clear cube corner retroreflective layer is about 30% for the same color film.

Figure 3:
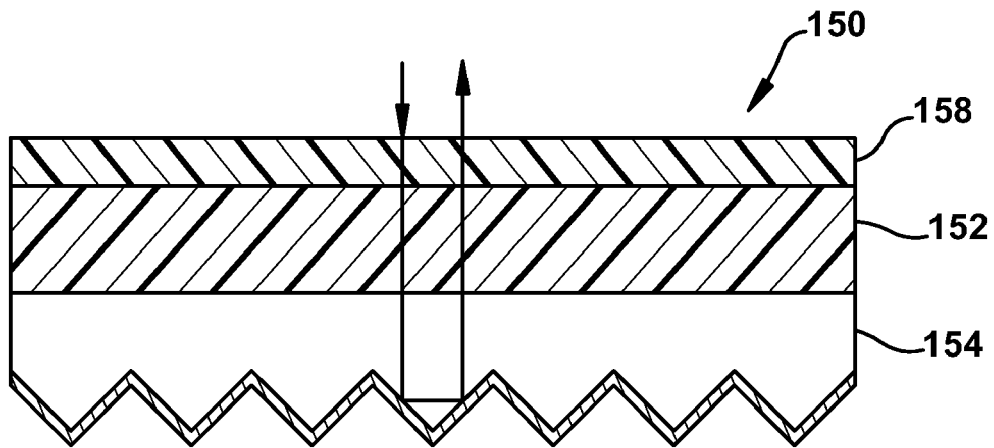
FIG. 3 illustrates a cross-sectional view of an infrared retroreflective sheeting in accordance with another aspect of the invention.

FIG. 3 shows an IR retroreflective sheeting 150 in accordance with another aspect of the invention similar to the IR retroreflective sheeting 100. The IR retroreflective sheeting 150 includes an IR film 152, a substantially clear retroreflective layer 154, and a cap or cover layer 158. The cap or cover layer 158 can potentially provide various functions or properties to the IR retroreflective sheeting 150. These functions or properties can include, for example, providing UV screening to retard chalking and hazing of polymers (e.g., polycarbonate) used in the IR retroreflective sheeting 150. UV screening can be provided by including an ultraviolet light absorbing compound or compounds into the cap or cover layer 158. Alternatively, UV screening can be provided by including a polymer in the cap or cover layer 158, which is itself an absorber of ultraviolet light. A polyarylate matrix is can be used in this regard as referenced hereinabove. Where the IR retroreflective sheeting 150 is used for signage or outdoor applications, the cap or cover layer 158 can also be used to enhance scratch resistance and graffiti protection. For example, the cap or cover layer 158, can comprise a hard coat silicone based polymer, such as is commercially available from GE Silicones, NY. Additionally, the cap or cover layer 158 may be selected to have other properties desirable for the front surface of a sign or the like, such as dew resistance and/or ease of printing.

The cap or cover layer 158 thickness can range between about 1 mil and about 10 mils (0.025 mm to 0.25 mm). For example, the cap or cover layer thickness can range between about 2 mils and about 5 mils (0.05 mm to 0.125 mm), and particularly between about 2 mils and about 4 mils (about 0.05 mm to about 0.100 mm).

Figure 4:
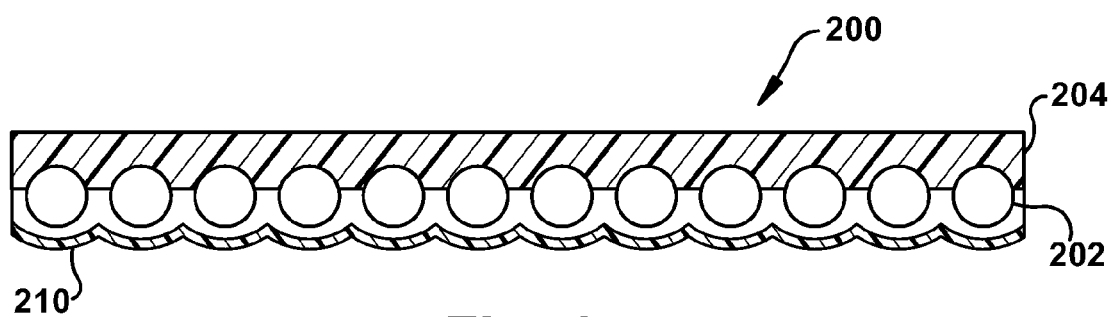
FIG. 4 illustrates a cross-sectional view of an enclosed lens infrared retroreflective sheeting material where the fluorescent sheeting in accordance with another aspect of the invention.

FIG. 4 illustrates that an IR film in accordance with the invention can be incorporated in an enclosed lens retroreflective sheeting article 200. Enclosed lens retroreflective sheeting is well known in the art. An early teaching in this regard is U.S. Pat. No. 2,407,680, herein incorporated by reference in its entirety, which discloses lenses, such as glass microspheres embedded in a sheeting structure with a flat, transparent cover film. In FIG. 4, glass microspheres 202 are embedded in an IR film 204. A specularly reflective layer 210 (e.g., vacuum deposited aluminum) can be provided in accordance with known art.

Figure 5:
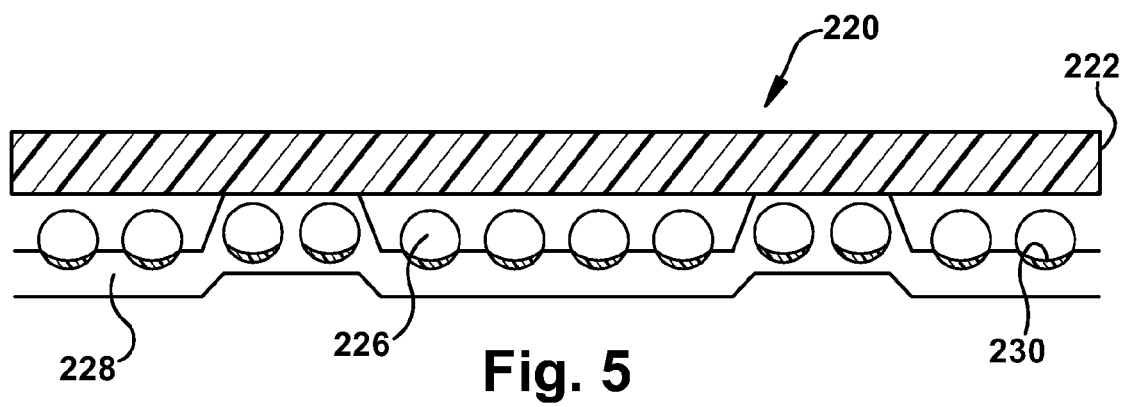
FIG. 5 is a cross-sectional illustration of an encapsulated lens infrared retroreflective sheeting material in accordance with another aspect of the invention.

FIG. 5 illustrates an IR film in accordance with the present invention can incorporated into an encapsulated lens retroreflective sheeting article 220. The IR retroreflective sheeting article 220 includes an IR film 222. A monolayer of lenses 226, such as glass microspheres, is at least partially embedded in a binder layer 228. The IR film 222 is sealed to the binder layer to hermetically seal the lenses 226. The illustrated lenses 226 have their own reflective surfaces 230 to provide reflection.

Figure 6:
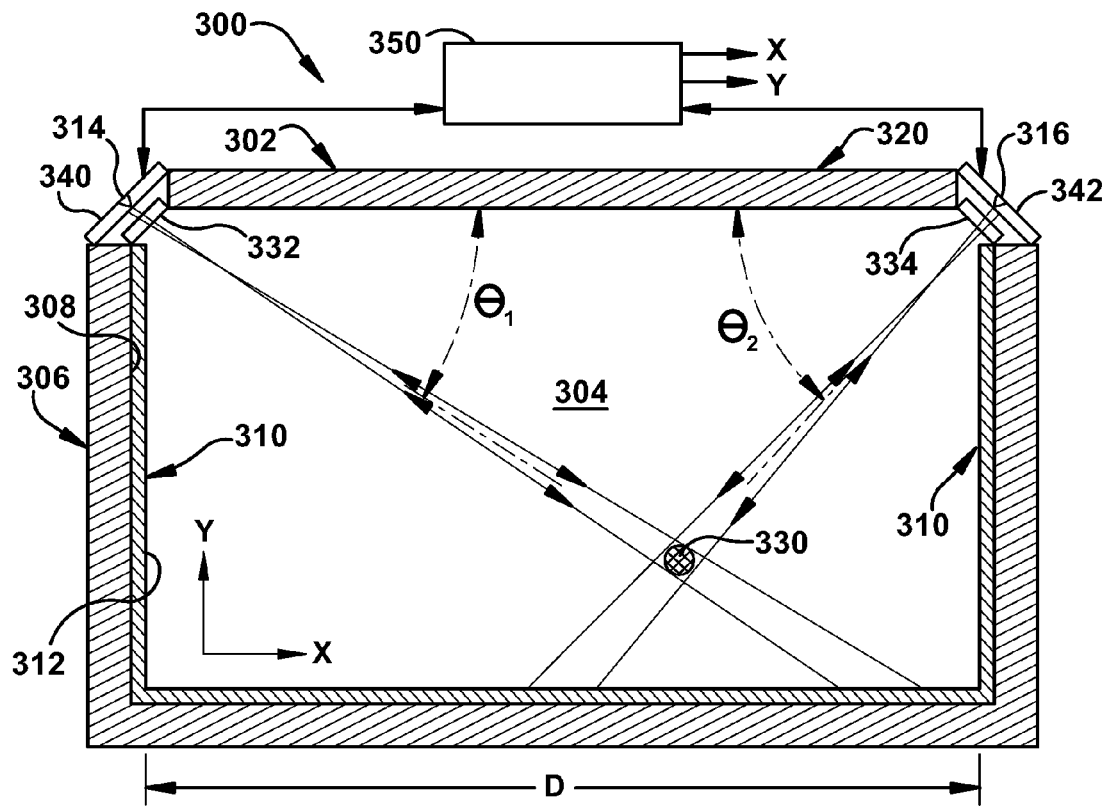
FIG. 6 illustrates a schematic view of a touch screen system that includes a infrared retroreflective in accordance with another aspect of the invention.

FIG. 6 illustrates a plan view of an example of a touch screen system 300 that includes an IR retroreflective sheeting in accordance with the present invention. The touch screen system 300 includes view a display 302 (e.g., a computer display, a touch screen display, etc.) having a screen area or viewing field 304 surrounded by a raised frame or border 306. An inner surface 308 of the border 306, which is generally substantially perpendicular to the viewing field 304 of the display screen 302, is provided with the IR retroreflective sheeting 310. The IR retroreflective sheeting 310 provides an IR retroreflective surface around at least a portion of the viewing field 304. The IR retroreflective sheeting 310 provides a surface 312 that reflects IR light from an IR light emitting source (e.g., IR light emitting diode (LED)) back toward the IR light emitting source. The IR retroreflective sheeting 310 can be applied directly to the border 306 through use of an adhesive or other attachment means, or it may be manufactured first in the form of an adhesive tape, which is subsequently applied to the inner surface of the border 306.

The position detection system 300 further includes two IR light emitting sources 314 and 316. The IR light emitting sources 314 and 316 can be point sources (or substantially point sources). The first source 314 is disposed at one corner of the viewing field 304 and the second source 316 is disposed at another corner of the viewing field 304. The first source 314 and second source 316 can be separated by a common side 320. The side 320 may not be provided with the IR retroreflective sheeting 310, which is provided on the other three sides of the display 302. One of ordinary skill in the art will readily appreciate that the precise location of the IR light emitting sources 314 and 316 may vary depending on a variety of design considerations, including environment, application, etc. Likewise, one of ordinary skill in the art will appreciate that the entire perimeter of the viewing field may be surrounded by the IR retroreflective sheeting 310.

The IR emitting sources 314 and 316 together illuminate the entire viewing field 304 with IR light, which extends in a direction parallel to the plane of the viewing field 304. In one example, the IR emitting sources 314 and 316 are infrared LEDs.

The IR retroreflective sheeting 310 provided around the perimeter of the viewing field 304 reflects the infrared light back toward the respective IR light emitting sources 314 and 316 as is indicated by the arrows within the viewing field 304. Thus, for example, a beam of infrared light originating from the source 314 extends outward to the side of the display screen and returns to the source 314. As discussed in more detail below, infrared light is reflected backward toward its source by the infrared retroreflective sheeting 310.

The position detecting system 300 operates to detect the existence and location of an object 330 within the borders 306. Assuming that the IR light originates from sources 314 and 316 (e.g., infrared LEDs) located at separate corners that have a common side 320, the IR light traverses outward and is reflected back into a corresponding lens 332 and 334 situated over the IR light emitting sources 314 and 316, respectively. The lenses 332 and 334 serve as optical apertures to image IR radiation transmitted by the IR sources 314 and 316 and received by IR detectors (e.g., cameras) 340 and 342, respectively.

Cameras 342 and 342 can be, for example, line scan cameras. Cameras 340 and 342 generally include an image capturing device in the form of a charge coupled device (CCD) sensor that is formed by a single line of photosensitive elements (e.g., pixels). In operation, reflected IR light passes through corresponding lenses (e.g., lens 332 or lens 334, depending on the location of the radiation source) and forms an image of an object detected by CCD sensor. A quantity of IR light is converted to a video pulse signal and is then output. The CCD sensor converts the detected light on a photo diode array to an electrical signal and outputs the measured amount. The outputs from the cameras 340 and 342 can be processed by a control unit 350 that produces output signals indicative of the X and Y coordinate position of the object 330.

If an opaque object 330, such as a stylus or a human finger, enters the viewing field, a shadow is cast on the lens 332 and 334 and the corresponding line scan camera 340 and 342, which results in very little or no charge being detected by the line scan camera for that particular pixel or area of pixels. In locations where IR light is detected, the IR light discharges a corresponding CCD sensor associated with the line scan camera, which generates a substantially higher signal value depending on the resolution of the line scan camera. If a combination of two light sources and line scan cameras are provided as are illustrated in FIG. 6, then the X and Y position of the object 330 may be determined by "triangulation". In this case, two angles θ1 and θ2 are measured and the X and Y coordinates are calculated from the values of these two angles plus the distance "D" between the two points of measurement, as shown in FIG. 6.

EXAMPLES

The following Example and Comparative Example are provided for purposes of illustration and explanation. The films used in the Example and Comparative Example were made using a C. W. Brabender Plasti-Corder Prep-Mixer (manufactured by C. W. Brabender Instruments, Inc. of Hackensack, N.J.). The material was compounded through melt mixing of polymer resins and other components and then converted into films about 6 mils (about 0.150 mm) using a heated Carver press. Mixing temperatures were in the range of between about 220° C. and about 240° C., and the mixing speed was about 100 rpm for a mixing time of between about 3 and about 6 minutes.

After preparing the films for the Example and Comparative Example, the light transmission of each film at different wavelengths was measured using a Perkin Elmer Lambda 12 UV/VIS Spectrometer. Each film was inserted into a container with an immersion liquid and scanned at wavelengths from about 380 nm to about 900 nm. The transmission of the films of the Example and Comparative Example were plotted and compared in FIG. 7.

Example

An infrared light transmission film was prepared by blending 85.2%, by weight, polymethyl methacrylate (PMMA) pellets, which are commercially available from Arkema, (FR) under the tradename DR101) with 12%, by weight, red color concentrate, which is commercially available from Polyone (Avon Lake, Ohio) under the tradename TVCO3219, 0.8%, by weight, blue color concentrate, which is commercially available from Americhem (Cuyahoga Falls, Ohio) under the tradename 5292-E2, and 2%, by weight, yellow color concentrate, which is commercially available from Americhem under the tradename 6299-E2. The blended polymers and colorants were pressed into a 6 mil film and the light transmission for various wavelengths was plotted as a plot 400 in FIG. 7.

Comparative Example

A comparative infrared light transmission film was prepared by blending 89.2%, by weight, polymethyl methacrylate (PPMA) pellets, which are commercially available from Arkema, (FR) under the tradename DR101) with 10%, by weight, red color concentrate, which is commercially available from Polyone (Avon Lake, Ohio) under the tradename TVCO3219, and 0.8%, by weight, blue color concentrate, which is commercially available from Americhem (Cuyahoga Falls, Ohio) under the tradename 5292-E2. The blended polymers and colorants were pressed into a 6 mil film, and the light transmission for various wavelengths was plotted as plot 402 in FIG. 7.

Figure 7:
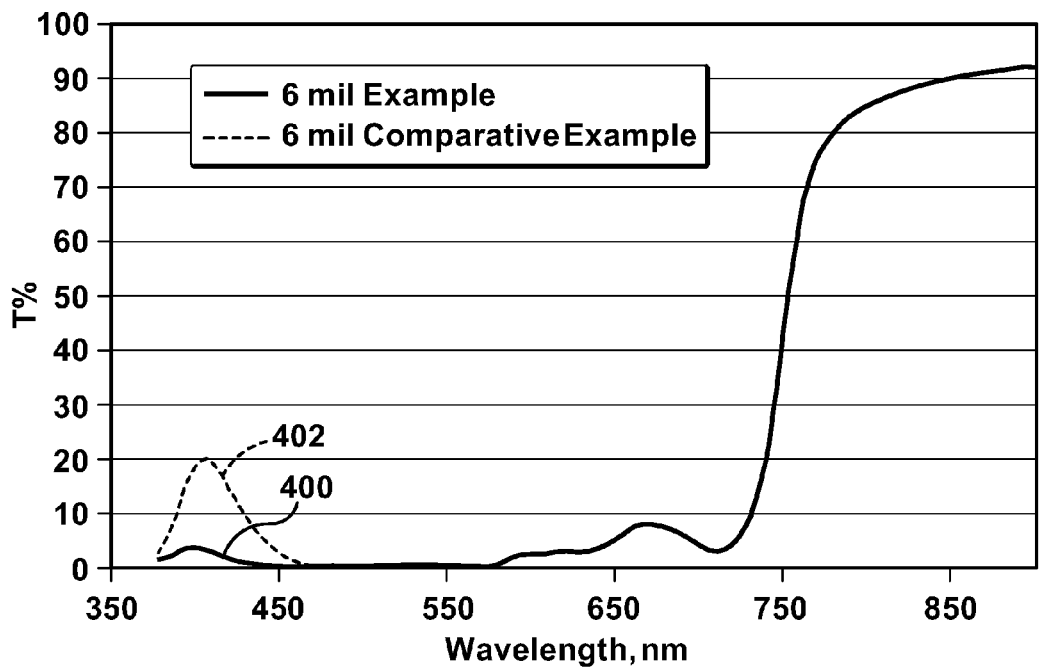
FIG. 7 illustrates plots of the light transmission as function of wavelength for an infrared light transmission film in accordance with the present invention and a comparative infrared light transmission film.

FIG. 7 illustrates that the infrared light transmission film of the Example including a red colorant, a blue colorant, and a yellow colorant dissolved in a PMMA matrix blocked at least about 90% of the light with wavelengths less than about 750 nm and allowed transmission of at least about 85% of light with wavelengths greater than about 800 nm. In contrast, the infrared light transmission film of the Comparative Example comprising only a red colorant and a blue colorant (i.e., free of yellow colorant) in a PMMA matrix blocked less than about 90% light with wavelengths less than about 750 nm. Particularly, the infrared light transmission film of the Comparative Example allowed transmission of about 20% of light with a wavelength of about 400 nm. An infrared transmission film having the desired blocking of at least about 90% of the light with wavelengths less than about 750 nm and allowing transmission of at least about 85% of light with wavelengths greater than about 800 nm was achieved by the combination of red colorant, blue colorant, and yellow colorant. An infrared light transmission film comprising just a red colorant and a blue colorant was unable to achieve the desired light blocking and transmission properties.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. An infrared light transmission film comprising:
a polymer matrix and at least one red colorant, blue colorant, and yellow colorant that are uniformly dispersed in the polymer matrix at amounts effective to allow transmission through the film of at least about 85% of light with wavelengths over about 800 nm while blocking transmission of at least about 90% of light with wavelengths less than about 750 nm,
wherein the film is disposed on a retroreflective layer having a plurality of retroreflective elements, and
wherein the red colorant is provided in the film at an amount of about 0.3% to about 4% by weight of the film, the blue colorant is provided in the film at an amount of about 0.1% to about 0.4%, by weight of the film, and the yellow colorant is provided in the film at an amount of about 0.1% to about 0.6% by weight of the film.

2. The film of claim 1, wherein the polymer matrix comprises a combination of red colorants, a combination of blue colorants, and a combination of yellow colorants.

3. The film of claim 1, wherein the colorants are provided in the film at an amount of about 0.05% to about 5% by weight of the film.

4. The film of claim 1, the polymer matrix comprising at least one of a polycarbonate, acrylic resin, polyester, polyvinyl chloride, polyurethane, polyolefin, polystyrene, styrene-acrylonitriles copolymer, polyarylate, polymethyl methacrylate, copolymers thereof, or combinations thereof.

5. The film of claim 1, wherein the film includes Ultraviolet (UV) absorbers and hindered amine light stabilizers.

6. The film of claim 1, the yellow colorant comprising Color Index (C.I.) Solvent Yellow 163, C.I. Solvent Yellow 114, and C.I. Solvent Yellow 109, the blue colorant comprising C.I. Solvent Blue 35 and C.I. Solvent Blue 36, and the red colorant comprising C.I. Solvent 227, C.I. Solvent Red 23, and C.I. Solvent Red 24.

7. The film of claim 1, wherein the retroreflective elements includes a plurality of cube corner retroreflective elements, glass microspheres or combinations thereof.

8. The film of claim 1, wherein the retroreflective layer includes a metalized layer.

9. An infrared retroreflective article comprising:
an infrared light transmission film that includes a polymer matrix and at least one red colorant, blue colorant, and yellow colorant uniformly dispersed in the polymer matrix at amounts effective to allow transmission through the film of at least about 85% of light with wavelengths over about 800 nm while blocking transmission of at least about 90% of light with wavelengths less than about 750 nm;
a retroreflective layer having a plurality of retroreflective elements; and
wherein the yellow colorant comprising Color Index (C.I.) Solvent Yellow 163, C.I. Solvent Yellow 114, and C.I. Solvent Yellow 109, the blue colorant comprising C.I. Solvent Blue 35 and C.I. Solvent Blue 36, and the red colorant comprising C.I. Solvent 227, C.I. Solvent Red 23, and C.I. Solvent Red 24.

10. The retroreflective article of claim 9, wherein the polymer matrix comprises a combination of red colorants, a combination of blue colorants, and a combination of yellow colorants.

11. The retroreflective article of claim 9, wherein the colorants are provided in the film at an amount of about 0.05% to about 5% by weight of the film.

12. The retroreflective article of claim 9, wherein the red colorant is provided in the film at an amount of about 0.3% to about 4%, by weight of the film, the blue colorant is provided in the film at an amount of about 0.1% to about 0.4%, by weight of the film, and the yellow colorant is provided in the film at an amount of about 0.1% to about 0.6% by weight of the film.

13. The retroreflective article of claim 9, the retroreflective element comprising an array of cube corner elements.

14. The retroreflective article of claim 9, further comprising a retroreflective substrate that includes the retroreflective elements, the infrared light transmission film is disposed on a first surface of the retroreflective substrate.

15. The retroreflective article of claim 14, the retroreflective substrate including a second surface that defines the retroreflective elements.

16. The retroreflective article of claim 15, further comprising a metalized layer disposed on the second surface of retroreflective substrate.

17. The retroreflective article of claim 14, the retroreflective substrate comprising a substantially transparent polymer matrix.

18. The retroreflective article of claim 9, wherein the retroreflective layer includes a metalized layer.

19. An infrared retroreflective sheeting comprising:
a retroreflective layer; and
an infrared light transmission layer disposed on a first surface of the retroreflective layer, the infrared light transmission layer including a polymer matrix and at least one red colorant, blue colorant, and yellow colorant uniformly dispersed in the polymer matrix at amounts effective to allow transmission through the infrared light transmission layer of at least about 85% of light at wavelengths over about 800 nm while blocking transmission of at least about 90% of light with wavelengths less than about 750 nm;
wherein the red colorant being provided in the infrared light transmission layer at an amount of about 0.3% to about 4%, by weight of the layer, the blue colorant being provided in the infrared light transmission layer at an amount of about 0.1% to about 0.4%, by weight of the layer, and the yellow colorant being provided in the infrared light transmission layer at an amount of about 0.1% to about 0.6%, by weight of the layer.

20. The retroreflective sheeting of claim 19, the polymer matrix comprising a combination of red colorants, a combination of blue colorants, and a combination of yellow colorants.

21. The retroreflective sheeting of claim 19, the colorants being provided in the infrared light transmission layer at an amount of about 0.05% to about 5% by weight of the infrared light transmission layer.

22. The retroreflective sheeting of claim 19, the yellow colorant comprising Color Index (C.I.) Solvent Yellow 163, C.I. Solvent Yellow 114, and C.I. Solvent Yellow 109, the blue colorant comprising C.I. Solvent Blue 35 and C.I. Solvent Blue 36, and the red colorant comprising C.I. Solvent 227, C.I. Solvent Red 23, and C.I. Solvent Red 24.

23. The retroreflective sheeting of claim 19, the retroreflective layer being substantially transparent and including a second surface opposite the first surface.

24. The retroreflective sheeting of claim 23, the second surface defining an array of cube corner elements.

25. A touch screen system comprising:
an infrared light emitting source for emitting infrared light in at least a portion of a viewing area;
an infrared retroreflective sheeting disposed along at least a portion of the viewing area for reflecting emitted infrared light; the retroreflective sheeting including a plurality of retroreflective elements and an infrared light transmission film, the film including a polymer matrix and at least one red colorant, blue colorant, and yellow colorant uniformly dispersed in the polymer matrix at amounts effective to allow transmission through the film of at least about 85% of light with wavelengths over about 800 nm while blocking transmission of at least about 90% of light with wavelengths less than about 750 nm;
an infrared light detector for detecting infrared light reflected by the infrared retroreflective sheeting; and
wherein the red colorant is provided in the film at an amount of about 0.3% to about 4%, by weight of the film, the blue colorant being provided in the film at an amount of about 0.1% to about 0.4%, by weight of the film, and the yellow colorant being provided in the film at an amount of about 0.1% to about 0.6%, by weight of the film.

26. The touch screen system of claim 25, the yellow colorant comprising Color Index (C.I.) Solvent Yellow 163, C.I. Solvent Yellow 114, and C.I. Solvent Yellow 109, the blue colorant comprising C.I. Solvent Blue 35 and C.I. Solvent Blue 36, and the red colorant comprising C.I. Solvent 227, C.I. Solvent Red 23, and C.I. Solvent Red 24.

27. The touch screen system of claim 25, the infrared retroreflective sheeting further comprising a retroreflective substrate that includes the retroreflective elements, the infrared light transmission film is disposed on a first surface of the retroreflective substrate.

28. The touch screen system of claim 27, the retroreflective substrate is substantially transparent and including a second surface that defines the retroreflective elements.

29. The touch screen system of claim 28, further comprising a metalized layer disposed on the second surface of the retroreflective substrate.

* * * * *